(12) United States Patent
Schnitzer et al.

(10) Patent No.: US 9,150,240 B2
(45) Date of Patent: Oct. 6, 2015

(54) STEERING COLUMN FOR A MOTOR VEHICLE

(71) Applicant: THYSSENKRUPP PRESTA AKTIENGESELLSCHAFT, Eschen (LI)

(72) Inventors: Hieronymus Schnitzer, Ruggell (LI); Philipp Manger, Bastheim-Reyersbach (DE)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 0 days.

(21) Appl. No.: 14/372,291

(22) PCT Filed: Dec. 17, 2012

(86) PCT No.: PCT/EP2012/005194
§ 371 (c)(1),
(2) Date: Jul. 15, 2014

(87) PCT Pub. No.: WO2013/107486
PCT Pub. Date: Jul. 25, 2013

(65) Prior Publication Data
US 2015/0053041 A1    Feb. 26, 2015

(30) Foreign Application Priority Data

Jan. 20, 2012  (DE) .......................... 10 2012 100 486
Jun. 13, 2012  (DE) ..................... 20 2012 102 159 U (51) Int. Cl.
*B62D 1/184*  (2006.01)
*F16F 7/06*   (2006.01)

(52) U.S. Cl.
CPC .. *B62D 1/184* (2013.01); *F16F 7/06* (2013.01)

(58) Field of Classification Search
CPC ................... B62D 1/184; F16F 7/06
See application file for complete search history.

(56) References Cited

U.S. PATENT DOCUMENTS 5,088,767 A    2/1992  Hoblingre et al.
5,394,767 A *  3/1995  Hoblingre et al. .............. 74/493
(Continued)

FOREIGN PATENT DOCUMENTS

DE   31 38 083       6/1982
DE   695 00 927      4/1998
(Continued)

OTHER PUBLICATIONS

International Search Report (ISR) issued Mar. 27, 2013 in International (PCT) Application No. PCT/EP2012/005194.
(Continued)

*Primary Examiner* — Faye M Fleming
(74) *Attorney, Agent, or Firm* — Wenderoth, Lind & Ponack, L.L.P.

(57) ABSTRACT

A steering column for a motor vehicle including a steering spindle bearing unit for rotatably supporting a steering spindle of the steering column and a bracket unit for securing the steering column on the motor vehicle. The steering spindle bearing unit is bearing supported by a securement device on at least one bracket part of the bracket unit, wherein the position of the steering spindle bearing unit relative to the bracket unit is secured in position in a closed position of the securement device and, in an open position of the securement device, is displaceable. The securement device includes an operating lever swivellable about a lever swivel axis, by which the operating lever is displaceable between the closed position and the open position. The steering column includes at least one damping element for damping the swivel movement of the operating lever about the lever swivel axis.

9 Claims, 4 Drawing Sheets

(56) References Cited

U.S. PATENT DOCUMENTS

| | | |
|---|---|---|
| 5,503,431 A | 4/1996 | Yamamoto |
| 5,596,907 A | 1/1997 | Barton |
| 5,598,741 A | 2/1997 | Mitchell et al. |
| 5,787,759 A | 8/1998 | Olgren |
| 6,089,780 A | 7/2000 | Lutz |
| 6,092,957 A | 7/2000 | Fevre et al. |
| 6,095,012 A | 8/2000 | Lutz |
| 6,173,822 B1 | 1/2001 | Korb et al. |
| 6,860,669 B2 | 3/2005 | Laisement et al. |
| 7,010,996 B2 * | 3/2006 | Schick et al. ............ 74/492 |
| 8,997,602 B2 * | 4/2015 | Tanaka ............ 74/493 |
| 2002/0062518 A1 | 5/2002 | Hellwig et al. |
| 2003/0052502 A1 | 3/2003 | Schmidt et al. |
| 2005/0178231 A1 * | 8/2005 | Schick et al. ............ 74/493 |
| 2006/0273567 A1 | 12/2006 | Fix |
| 2008/0143092 A1 | 6/2008 | Menjak et al. |
| 2008/0185829 A1 | 8/2008 | Senn |
| 2008/0229867 A1 | 9/2008 | Waibel et al. |
| 2009/0013817 A1 | 1/2009 | Schnitzer et al. |
| 2009/0020995 A1 | 1/2009 | Kim |
| 2011/0064538 A1 | 3/2011 | Oertle et al. |
| 2011/0156380 A1 | 6/2011 | Dietz et al. |
| 2011/0290605 A1 | 12/2011 | Krawczyk et al. |
| 2012/0144953 A1 | 6/2012 | Schnitzer |
| 2012/0285286 A1 | 11/2012 | Schnitzer et al. |
| 2013/0104688 A1 | 5/2013 | Okada et al. |
| 2013/0174684 A1 * | 7/2013 | Burns ............ 74/493 |

FOREIGN PATENT DOCUMENTS

| | | |
|---|---|---|
| DE | 197 18 031 | 8/1998 |
| DE | 198 05 289 | 8/1998 |
| DE | 197 45 038 | 7/1999 |
| DE | 100 51 805 | 5/2002 |
| DE | 102 25 089 | 1/2003 |
| DE | 101 61 849 | 6/2003 |
| DE | 10 2006 024 749 | 12/2006 |
| DE | 10 2005 052 123 | 1/2007 |
| DE | 10 2005 043 988 | 3/2007 |
| DE | 10 2005 045 365 | 3/2007 |
| DE | 20 2005 021 095 | 5/2007 |
| DE | 10 2007 003 091 | 8/2008 |
| DE | 10 2008 011 618 | 7/2009 |
| DE | 10 2008 028 460 | 12/2009 |
| DE | 10 2008 024 405 | 1/2010 |
| DE | 10 2008 045 143 | 3/2010 |
| DE | 696 10 067 | 4/2011 |
| DE | 10 2009 055 973 | 6/2011 |
| DE | 10 2010 029 252 | 12/2011 |
| DE | 10 2011 054 196 | 12/2012 |
| EP | 0 592 278 | 4/1994 |
| EP | 0 600 700 | 6/1994 |
| EP | 0 782 951 | 7/1997 |
| EP | 0 802 104 | 10/1997 |
| EP | 1 110 843 | 6/2001 |
| EP | 1 795 425 | 6/2007 |
| EP | 1 870 309 | 12/2007 |
| EP | 2 003 364 | 12/2008 |
| EP | 2 431 257 | 3/2012 |
| FR | 2 802 166 | 6/2001 |
| FR | 2 822 782 | 10/2002 |
| FR | 2 834 680 | 7/2003 |
| GB | 2 087 808 | 6/1982 |
| JP | 2-92779 | 4/1990 |
| JP | 2000-16303 | 1/2000 |
| JP | 2005-193745 | 7/2005 |
| JP | 1 747 967 | 1/2007 |
| JP | 2008-230452 | 10/2008 |
| JP | 2010-184656 | 8/2010 |
| WO | 96/15931 | 5/1996 |
| WO | 2007/009576 | 1/2007 |
| WO | 2009/105798 | 9/2009 |
| WO | 2011/020538 | 2/2011 |
| WO | 2012/011424 | 1/2012 |
| WO | 2013/050095 | 4/2013 |
| WO | 2013/071317 | 7/2013 |
| WO | 2013/097922 | 7/2013 |
| WO | 2013/143635 | 10/2013 |

OTHER PUBLICATIONS

International Search Report issued May 13, 2013 in International (PCT) Application No. PCT/EP2013/000424.

International Search Report issued Sep. 12, 2012 in International (PCT) Application No. PCT/AT2012/000143.

* cited by examiner

Fig. 8

STEERING COLUMN FOR A MOTOR VEHICLE

BACKGROUND

Generic steering columns are distinguished thereby that the position of the steering wheel secured on the steering spindle can be adapted to the driver. Steering columns are known in prior art which are height adjustable as well as also those that are adjustable in the longitudinal or length direction of the steering spindle and steering columns that are adjustable in both directions. The securement device serves for retaining the steering spindle bearing unit, and therewith the steering spindle, in the closed position in the set position, while in the open position of the securement device the desired displacement, and therewith adaptation to the position and size of the driver, is feasible. The securement device can be brought from the closed position into the open position and conversely by actuating the operating lever. The operating lever is for this purpose swiveled about the lever swivel axis. The lever swivel axis could also be referred to as lever swivel axle. By swiveling the operating lever about the lever swivel axis a deflection in the longitudinal direction of the lever swivel axis occurs as a rule whereby the securement device is brought from its open position into the closed position and conversely. To make the movement between open position and closed position and/or in the opposite direction uniform, it is known to provide damping elements for damping the swivel movement of the operating lever about the lever swivel axis. A generic embodiment example of such an adjustable steering column is depicted for example in DE 197 18 031 C1. The damping element is here integrated in the form of a rotation damper into the operating lever which, however, entails the disadvantage of a relatively complex and complicated structure of the operating lever.

The invention addresses the problem of avoiding this disadvantage in generic steering columns with at least one damping element.

SUMMARY

According to the invention it is consequently provided for the damping element to be disposed on a side of the bracket part opposite the operating lever.

Stated differently, the solution of the above defined problem lies according to the invention therein that at least one bracket part of the bracket unit is disposed between the operating lever and the damping element. A fundamental concept of the invention is thus disposing the damping element no longer in the proximity of the operating lever, but rather at another site wherewith the construction in particular in the proximity of the operating lever is simplified.

Through the damping element the swivel or rotation speed of the operating lever during the swiveling about the lever swivel axis is decreased. Rattling or clattering of the securement device during the movement is thereby at least strongly decreased or entirely prevented. Overall, the result is an acceptable uniform movement in the securement device.

It is advantageously provided that the damping element comprises a speed-dependent damping function. In other words, it is thus preferably provided that the damping element damps at different strengths at different swivel speeds about the lever swivel axis. It can be provided, for example, that at rapid swiveling the braking effect is especially strong, while with slow swiveling the braking effect is less.

In a preferred embodiment the damping element is realized such that the damping effect of the damping element at least in one swivel direction is effective for at least 20%, preferably for at least 50%, of the maximally possible swivel angle sector of the swiveling of the operating lever about the lever swivel axis. It is herein to be especially preferred for the damping effect, at least in one swivel direction, to be effective for at least two thirds or even more, preferably for at least three fourths, of the possible swivel sector. A damping effect over the entire swivel sector, however, is for the most part not required since in the range of high clamping force through the high friction forces resulting therefrom high damping in the securement device is already given by itself. It can preferably be provided to reduce the damping effect of the damping element for the swivel sector or to suppress it altogether thereby that the clamping forces of the securement device assume values that are greater than or equal to three fourths of the maximally provided clamping force of the securement device.

Through the damping acting over a large swivel sector a strong acceleration of the operating lever, in particular during opening, can be prevented such that increased vibrations and/or contact impacts, especially during opening, are reduced.

However, it is not mandatory that the operating lever be manually operable. A motor drive is also feasible.

Preferred embodiments of a steering column according to the invention provide that the damping element damps the swiveling more strongly in one of the swivel directions about the lever swivel axis than in the swivel direction opposite thereto. In these terms it is, for example, conceivable and feasible for the damping element to exhibit freewheeling in one of the swivel directions about the lever swivel axis. Especially preferred embodiments of the invention provide that the damping element acts only during opening, not however during closing, of the securement device. Stated differently, it can consequently be provided that the damping element damps exclusively during the swiveling of the operating lever from a closed position of the securement device into an open position of the securement device.

However, it is not absolutely necessary for freewheeling to be provided in the closed direction. In contrast, it can also be provided that the damping element during the swiveling of the operating lever from the closed position of the securement device into the open position of the securement device damps the swiveling more strongly than the swiveling into the opposite direction.

The utilized damping element is preferably an energy-consuming damping element. This means that in the damping process energy is, preferably completely, consumed or annihilated and not stored. The energy consumed by the damping element is most often converted to heat and can no longer be conducted back into the securement device as kinetic energy. This differentiates the energy-consuming damping elements also from elastic spring elements or the like. While, given the appropriate realization, via such spring elements a brake effect can also be attained. However, the energy removed during this braking is stored as elastic deformation through the non-generic spring elements and later, at least in part, conducted back into the system. However, the feedback of the energy into the system increases the tendency toward vibration and therewith the risk of the operating lever to clatter during the opening and/or closing of the securement device. In the case of the energy-consuming damping element utilized according to the invention such a feedback of energy is not possible.

It has unexpectedly been found that energy-consuming damping elements known from the construction of fittings for the furniture industry can, at least from the point of view of their basic structure, be utilized for securement devices according to the invention. For example, these can be fluid dampers known per se. In these terms, preferred variants of the securement device according to the invention provide that the damping element comprises at least two structural damper parts moving relative with respect to one another and at least one damping fluid, wherein the damping fluid for damping the structural damper parts moving relative to one another is disposed between these parts, or acts between them. Such damping elements are known as linear dampers but also as rotation dampers in the already described production of furniture fittings. It is especially preferably provided that the damping element is a rotation damper or comprises one such rotation damper. Such damping elements in the form of rotation dampers advantageously comprise at least two structural damper parts that are rotatable relative to one another about a rotational damper axis.

However, the damping element can also be a type of pure friction damper in which at least one frictional closure acts between the structural damper parts. A combination of both damper types is also feasible.

In the case of rotation dampers, one of the structural damper parts can be, for example, a housing of the rotation damper. The other of the structural damper parts movable relative to one another can in this case be a rotor rotatably supported in the housing. The preferably energy-consuming damping effect can be generated, for example, in a damping fluid which acts or is disposed between the rotor and the housing, or be generated between friction faces. The damping fluids can be fluids such as for example oils, silicon or other, preferably highly viscous, materials. However, air or another gas can also be employed as the damping fluid. The energy-consuming damping effect occurs in such implementations through the extrusion of the damping fluid or thereby that the damping fluid is pressed through suitably formed choke sites or restrictions or the like. In prior art a multiplicity of suitable dampers of this type is known. An alternative to the hydraulic or pneumatic dampers represent the pure slide dampers which are based on friction closure. These implementations advantageously provide that the structural damper parts comprise synthetic material surfaces at least in the region of the friction closure, or are entirely implemented of synthetic material.

Preferred embodiments of the invention provide for the securement device to comprise a clamp bolt penetrating through the bracket part or the bracket parts, on which bolt the operating lever is disposed. In terms of compact construction it can herein be provided that the damping element is disposed on top of or on the clamp bolt. An especially tight compactness and simplicity of structure is also attained thereby that the rotational damper axis is disposed coaxially with the lever swivel axis about which the operating lever is swivel-able. It is also advantageous if the securement device comprises a clamp bolt penetrating the bracket part or the bracket parts, on which bolt the operating lever is disposed and the clamp bolt is disposed coaxially with the lever swivel axis about which the operating lever is swivel-able.

Preferred variants provide for the securement device to comprise a clamp bolt penetrating the bracket part or the bracket parts, on which bolt the operating lever is disposed, and one of the structural damper parts to be connected torque-proof with the clamp bolt and the other of the structural damper parts to be connected torque-proof with the bracket part or one of the bracket parts. The structural damper part connected torque-proof with the clamp bolt can be connected with the clamp bolt for example under form closure with respect to the turn or rotation direction. Another advantageous variant provides that one of the structural damper parts is preferably under form closure connected with a nut secured on the clamp bolt or is in this manner seated on the nut. For the sake of completeness, reference is made to the fact that the term "torque-proof" is to be interpreted to the effect that between the structural damper part and the clamp bolt or the bracket part a type of securement is provided which, during the turning into at least one of the rotational directions, represents a fixed connection. Herein small turning plays can also be permitted. However, this does not absolutely mean that with movements into other directions a fixing between these two structural parts is also necessary, although this can be realized in such manner.

Especially preferred embodiments of the invention provide for the damping element to be realized as a retrofit structural part for already existing securement devices or steering columns. It is for this purpose advantageous if one of the structural damper parts, in particular the one not connected torque-proof with the clamp bolt, is connected torque-proof with the bracket part or one of the bracket parts by means of a preferably destructionlessly detachable connection. By a connection that is destructionlessly detachable is understood in this context a connection which is provided or laid out for being detachable using simple means or handles. Examples of such connections that are detachable without destruction are, for example, bolt or snap connections in which a new assembly is possible after a preceding disassembly. Through this configuration a damping element can be produced as a modular building set for different steering columns.

The securement device of a steering column according to the invention is advantageously configured such that it executes a deflection in the direction parallel to the swivel axis during the swiveling of the operating lever about the lever swivel axis. It is further advantageous for the securement device to comprise at least one cam clamping system. Such cam clamping systems advantageously comprise at least two cam carriers on each of which at least one cam is disposed. The cam clamping systems or in particular their cam carriers can be seated on the clamp bolt of the securement device. It is advantageously provided that one of the cam carriers is connected with its cam or cams with the operating lever such that it is torque-proof with respect to a turning about the lever swivel axis. The other cam carrier with its cam or cams in this case can be connected torque-proof, for example with respect to a rotation about the lever swivel axis, with the bracket part or one of the bracket parts of the bracket unit. Cam clamping systems of this type are known in a multiplicity of implementations. The cams can be secured rotatably on the particular cam carrier or be fixed or unitarily, thus not rotatably, on the cam carrier. In the case of the latter the cams of the first cam carrier cooperate, during the turning of the cam carriers relative to one another about the lever swivel axis, with the cam or the cams of the other cam carrier exclusively by sliding along one another. The damping elements according to the invention are employed especially preferably in cam clamping systems with such cams cooperating exclusively by sliding along one another.

The cams form a type of mountain range on the cam carriers and project beyond the base of the cam carrier. It is known to provide the desired actuation and clamping forces for example by forming the steepness of the flanks of the cams correspondingly. The cams project advantageously from a corresponding base of the particular cam carrier in the direction parallel to the lever swivel axis. Each cam carrier comprises at least one cam. However, as a rule, each cam carrier comprises several cams. The cam carriers or their base can be realized in the form of a disk. In this case the base forms also the indentations or valleys between the cams forming the mountain ranges. In the operating position the cams of the one cam carrier and those of the other cam carrier are advantageously directed toward one another.

It is especially preferable that the damping element is separated through at least one bracket part not only from the operating lever but also from the cam clamping system. It can be provided, for example, for the operating lever and the cam clamping system to be disposed on one side of a bracket part and the damping element on an opposite side of this bracket part. In steering columns according to the invention the bracket unit provided for the securement of the steering column on the body of the motor vehicle comprises precisely one bracket part which is disposed between the damping element and the operating lever.

Especially preferred embodiments of the invention, however, provide for the bracket unit to comprise two bracket parts and for the steering spindle bearing unit to be disposed between the bracket parts, wherein the damping element is disposed between the bracket parts or both bracket parts are disposed between the damping element and the operating lever. This type of steering column preferably comprises precisely two bracket parts which are also often referred to as side jaws. However, it is also feasible for two, thus also more than two, bracket parts to be involved.

BRIEF DESCRIPTION OF THE DRAWINGS

In the Figures several different steering columns according to the invention with corresponding securement devices and damping elements are depicted. In the drawings.

DETAILED DESCRIPTION

Figure 1:
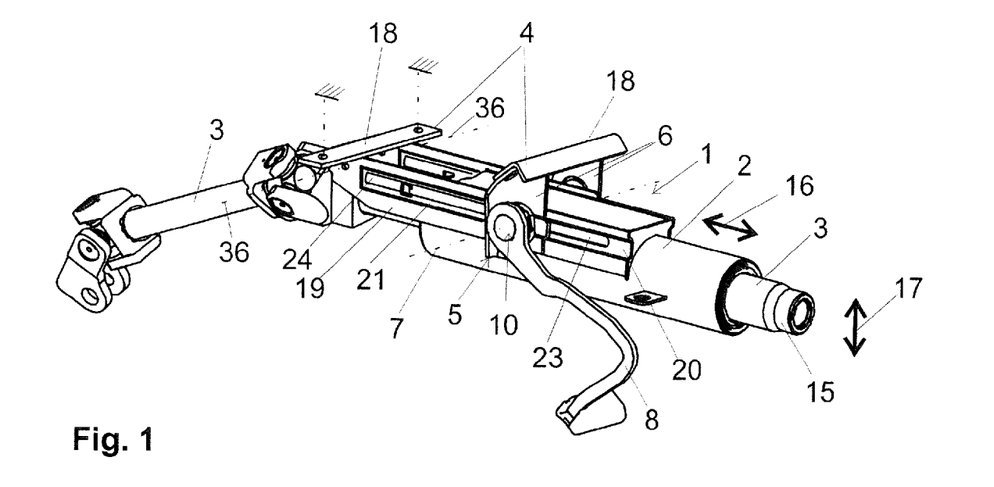
FIG. 1 is a perspective outer view onto a steering column developed according to the invention.

First, in conjunction with FIG. 1 the general structure of the first embodiment example according to the invention of a steering column 1 will be explained by example. The bracket unit 4 is provided for the purpose of being secured in position by means of the securement plates 18 on the body of the motor vehicle. It supports the steering spindle bearing unit 2 in which the steering spindle 3 is supported rotatably about its longitudinal axis not shown here. The steering wheel, not shown here, can be secured on the steering wheel adapter 15 of the steering spindle 3. For the adaptation of the position of the steering wheel the steering spindle bearing unit 2 in this adjustable steering column 1 can be displaced in the longitudinal or length directions 16 as well as also in the height directions 17. For this purpose the securement device 5 must be in its open position. After setting the desired position of the steering wheel, the operating lever 8 in the depicted embodiment example is manually swiveled upwardly and the securement device 5 therewith brought into its closed position in which it fixes the position of the steering spindle bearing unit 2 in the bracket unit 4. In the prior art, fixing the steering spindle bearing unit 2 in the bracket unit 4 under friction closure as well as also under form closure is known. Both methods can also be realized in connection with the invention. The first embodiment example involves a variant developed exclusively for fixing under friction closure. For the sake of completeness, reference is made to the fact that steering columns 1 according to the invention can also be adjustable only in the height direction 17 or only in the longitudinal direction 16.

If the steering columns 1 are adjustable in both of these directions, preferably, as is also realized here in the first embodiment example, a so-called intermediate part 19 is provided which is preferably secured on the bracket unit 14 such that it is swivel-able about a horizontal axis. The intermediate part 19 can, as is also realized here in the first embodiment example, be disposed between the side jaws or bracket parts 6 of the bracket unit 4 and the steering spindle bearing unit 2. The longitudinal displacement in the directions 16 takes place in this embodiment example thereby that the steering spindle bearing unit 2 is shifted relative to the intermediate part 19 into at least one of the directions 16. For the height displacement in directions 17 the steering spindle bearing unit 2 is swiveled, together with the intermediate part 19, about a swivel axis 36 relative to the bracket unit 4 in the vertical direction. It is understood that here also entirely different forms of implementation are feasible. The invention can also be realized with steering columns in which the steering spindle bearing unit 2 is retained on a single bracket part 6 of the bracket unit 4.

The steering spindle bearing unit 2 as well as also the intermediate part 19 each comprise in the depicted embodiment example a bead 20 or 21 by means of which they are supported one in the other. This type of beads 20, 21 engaging one into the other permits the length displacement in the longitudinal direction 16, yet in other respects ensures a highly stable tilt-proof bearing of the steering spindle bearing unit 2 in the intermediate part 19 and therewith in the bracket unit 4. The clamp bolt 10 of the securement device 5 in such implementations can, as is also realized here, advantageously be guided through the steering spindle bearing unit 2 and the intermediate part 19 in the proximity of the beads 20 and 21, in particular in their bead bases. In the beads 20 and 21 in the depicted embodiment example for this purpose elongated holes 23 and 24 are realized which also enable the displacement in the longitudinal directions 16. For the realization of the height adjustability in the height directions 17 in each of the side jaws or bracket parts 6 an elongated hole 26 is disposed in which the clamp bolt 10, together with securement device 5, can be moved in the open position of the latter in order to attain a vertical displacement.

In its closed position the securement device 5 clamps the bracket parts 6 of the bracket unit 4 in the first embodiment example against the steering spindle bearing unit 2 under friction closure wherewith the latter is fixed in its position. In order to generate this clamping effect, in the depicted embodiment example, the cam clamping system 22, not further shown here in detail but known per se, with two cam carriers 31 and cams 32 disposed thereon is realized. One of the cam carriers 31 is, with respect to turning about the lever swivel axis 7, connected torque-proof with the operating lever 8. The other of the cam carriers 31 is connected torque-proof with respect to a turning about the lever swivel axis 7 with one of the bracket parts 6. Through the sliding along one another of the cams 32 of the two cam carriers 31 during the turning or swiveling of the operating lever 8 about the lever swivel axis 7 a deflection in the direction of the lever swivel axis 7 is generated for tightening and releasing the securement device 5 in each instance. This is known per se and does not require further explanation here.

According to the invention on this steering column 1, known per se with respect to the above described features, a damping element 9 is now provided for the mutual mitigation or damping of the rotation or swivel movement of the operating lever 8 about the lever swivel axis 7. In the depicted embodiment example the damping element 9 is seated directly on the clamp bolt 10. The rotational damper axis 11, about which the two structural damper parts 12 and 13 can be turned relative to one another, is located coaxially with the lever swivel axis 7. According to the invention the damping element 9 is spatially separated from the operating lever 8 by at least one bracket part 6. Operating lever 8 and cam clamping system 22 are in the depicted embodiment example disposed on one side of one of the bracket parts 6; the damping element 9 is located on the side of the other bracket part 6 opposite thereto. In the embodiment example depicted here, it is consequently provided that both bracket parts 6 are disposed between the damping element 9 and the operating lever 8 or also the cam clamping system 22.

Figure 5:
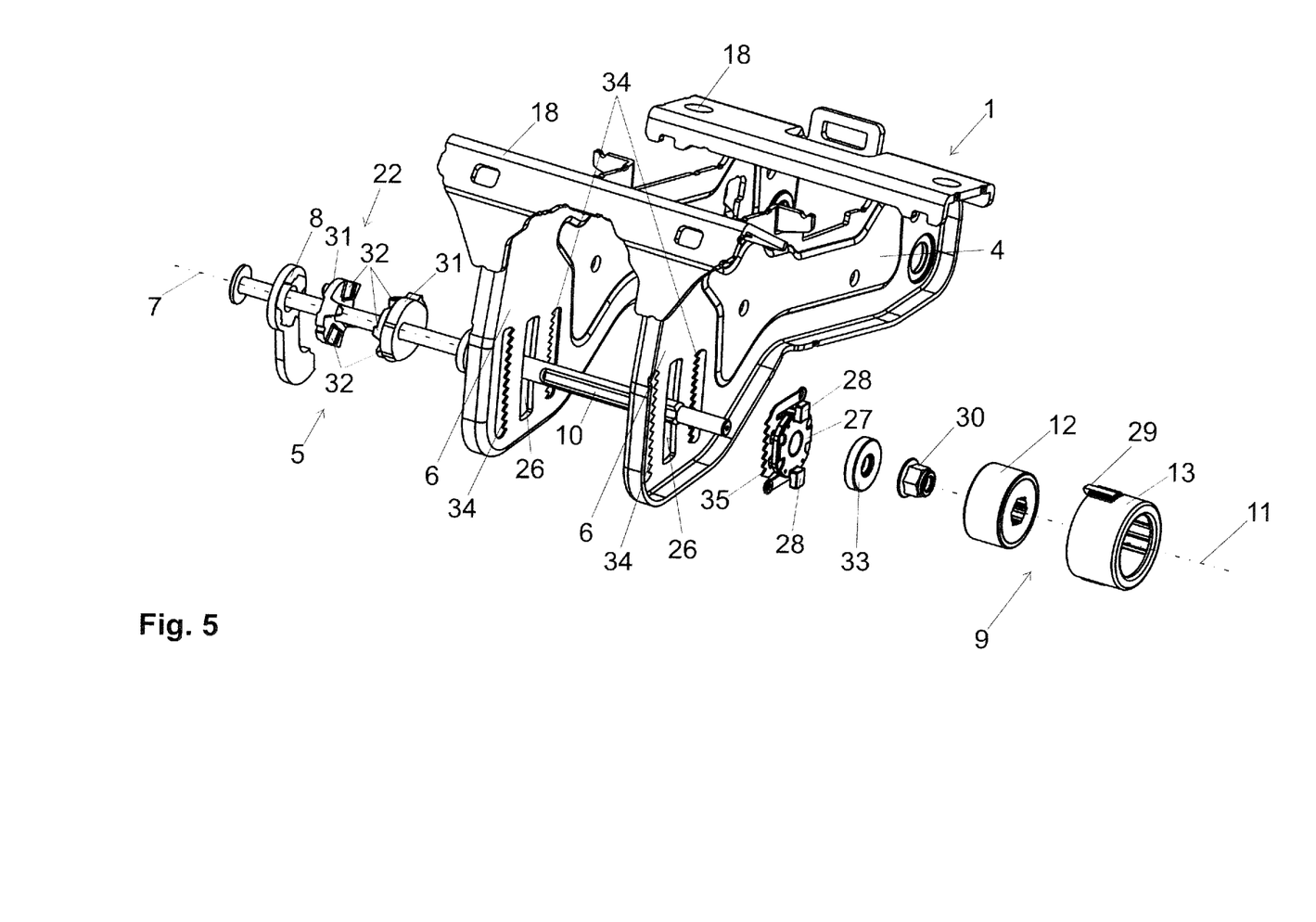
FIG. 5 shows components of a second embodiment according to the invention of a steering column with a securement device in exploded depiction.

The damping element 9 realized in this first embodiment example is the same friction rotation damper as is depicted in the second embodiment example according to FIG. 5 in an exploded view. The structural damper part 12 in the embodiment realized here is a type of cylinder whose external cylinder jacket surface forms the first friction face. The second friction face cooperating therewith is the inner jacket face, also preferably implemented in the form of a cylinder jacket, of the structural damper part 13 implemented here in the shape of a cylinder jacket tube. The friction faces are advantageously at least coated with synthetic material. It is especially simple if the structural damper parts 12 and 13 are entirely comprised of synthetic material. In the first two embodiment examples the structural damper part 12 is connected torque-proof with the clamp bolt 10. In these embodiments this is realized thereby that the structural damper part 12 includes a central recess which is seated under form closure on the nut 30 secured torque-proof correspondingly on clamp bolt 10.

The second structural damper part 13 is connected torque-proof with the corresponding bracket part 6, and therewith the bracket unit 4 to the body of the motor vehicle. This connection 14 is implemented as a snap connection in the embodiment examples explained so far. For this purpose the structural damper part 13 comprises snap hooks 29 with which the structural damper part 13 is snapped onto pegs 28 of a bearing part 27 of the securement device 5 whereby the torque-proof securement of the structural damper part 13 on the bracket part 6 is realized since the bearing part 27 comprises additionally guide pegs 25 with which it engages, at least in the closed position of the securement device 5, into the corresponding elongated hole 26 of the bracket part 6. For the purpose of retrofitting a corresponding damping element 9 on a steering column 1 not initially provided with a damping element, it suffices in these first two embodiment examples to secure initially the structural damper part 12 under form closure on the nut 30 or the clamp bolt 10. The second structural damper part 13 can subsequently via the described connection 14 be secured on the bearing part 27 and therewith torque-proof on the bracket part 6. In the embodiment examples depicted here for this purpose snapping the snap hooks 29 onto the bearing parts 27, or their pegs 28, suffices.

Figure 2:
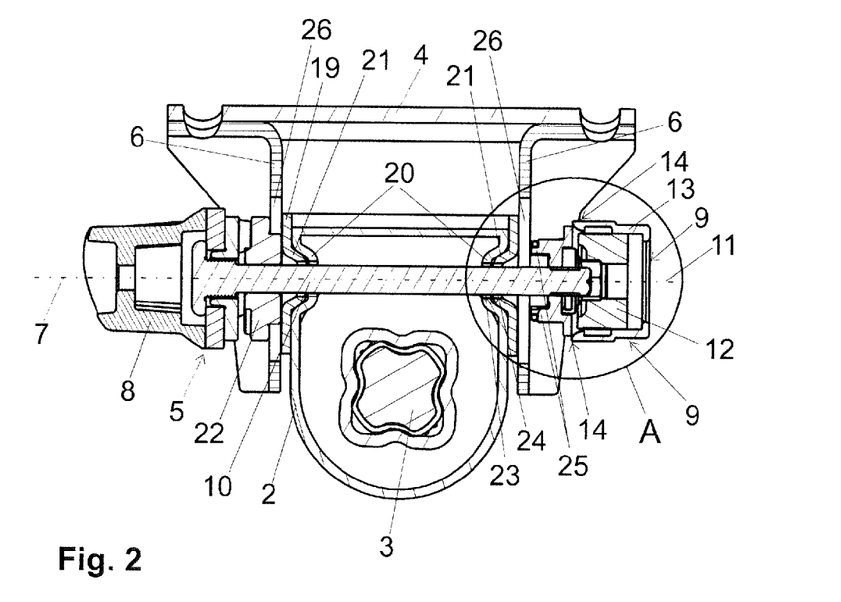
FIG. 2 is a vertical section view through this steering column in the proximity of the clamp bolt with pulled-apart damping element.
Figure 3:
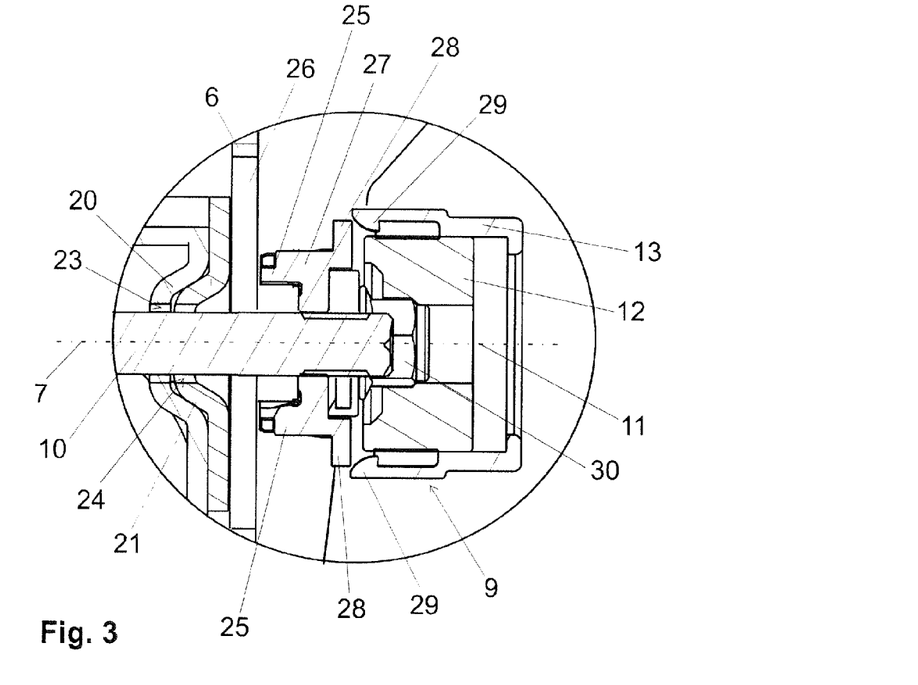
FIG. 3 shows the area A from FIG. 2 in an enlargement.
Figure 4:
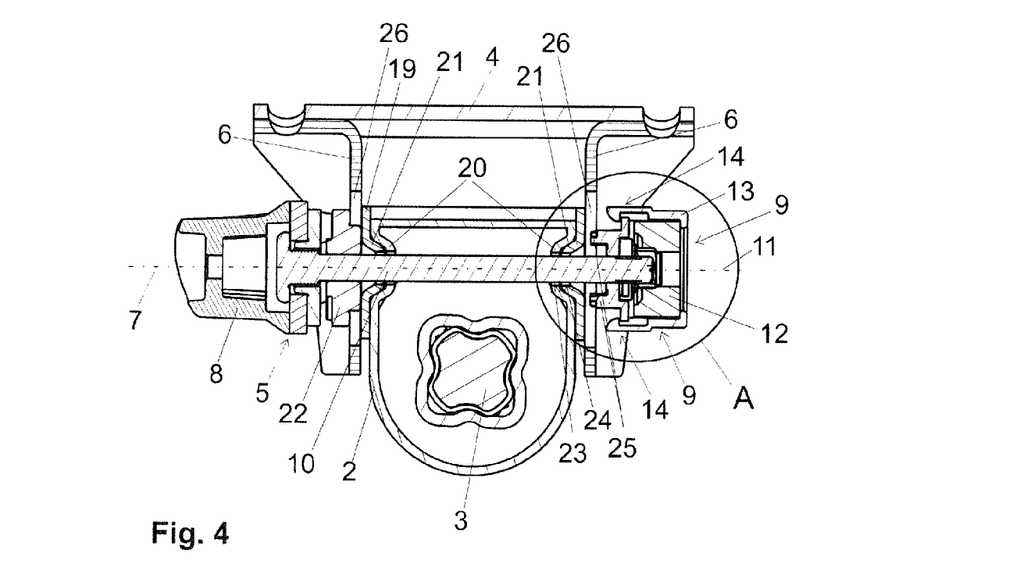
FIG. 4 is a vertical section view through this steering column in the proximity of the clamp bolt with the pulled-apart damping element, in operating position.

Simple and rapid retrofitting of the steering column 1 with a damping element 9 is hereby enabled. It is understood that, instead of the connection 14 developed as a snap type, other, particular readily detachable connections, can also be realized. Bolting should be mentioned here as an example. Instead, permanent connections, for example by welding or unitary fabrications from the outset are, of course, also conceivable. In FIGS. 2 and 3 of the first embodiment example the structural damper part 13 has not been completely snapped onto the pegs 28. This state, after the snapping is complete, is depicted in FIG. 4 which subsequently corresponds to the operating state of steering column 1.

Figure 6:
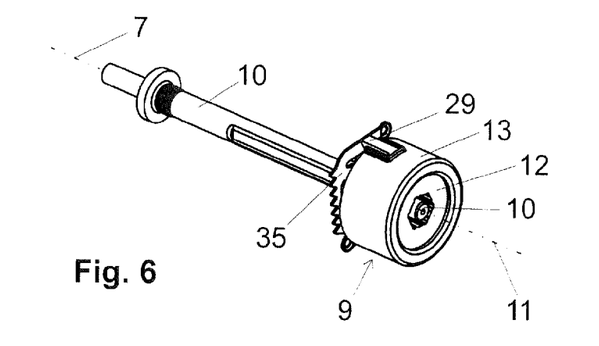
FIG. 6 shows the clamp bolt with the damping element of the second embodiment example detached from the remaining structural parts.

The second embodiment example of the invention according to FIGS. 5 and 6 corresponds to a large extent to those previously described. In the exploded view of the securement device 5 the cam carriers 31 and cams 32 forming the cam clamping system 22 are more clearly discernible. The substantial difference between the two first embodiment examples, however, lies in that in the second embodiment example a form-closure fixing of the steering spindle bearing unit 2, not shown in FIG. 5, on the bracket unit 4 is realized by means of the toothed racks 34 and the toothing element 35 resiliently secured on bearing part 27, when the securement device 5 is in its closed position. The toothed racks 34 and the toothing element 35 are known in prior art and do not require further explanation here. In this regard reference is made to WO 2007/009576 or DE 10 2007 003 091 B3. The washer disk 33, which is clearly visible in FIG. 5 in the exploded view, serves for staying the nut 30 on the bearing part 27.

Figure 7:
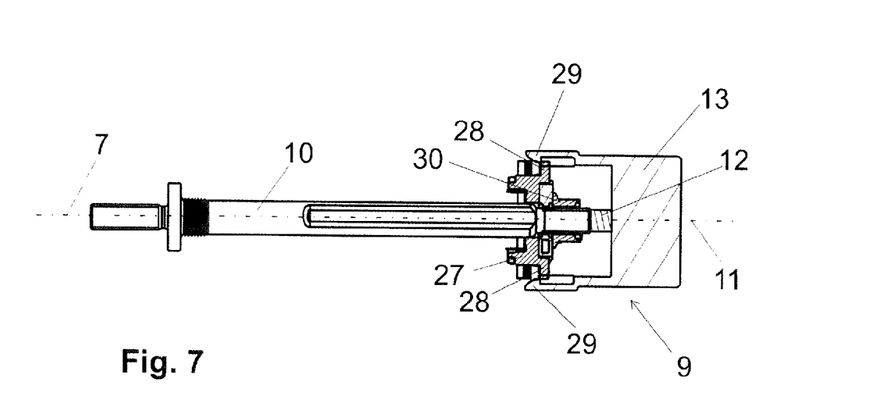
FIG. 7 shows a variant according to the invention of FIG. 4.

The damping element 9 in the first embodiment examples is, as stated, a rotation damper based on friction closure. FIG. 7 shows highly schematically an alternative, in which a fluid rotation damper known per se is employed. This damper is depicted here only in highly schematic form. The structural part 13 forms the housing in which a rotor of the structural damper part 12 is rotatably supported. A damping fluid that generates the desired damping acts between the housing of the structural damper part 13 and the rotor of the structural damper part 12. Such fluid rotation dampers are known per se and do not require further explanation. The structural damper part 13 of this embodiment example according to FIG. 7 is also supported by means of a snap connection 14, thus by means of the snap hooks 29, on the pegs 28 corresponding thereto and therewith supported torque-proof on the bracket part 6. The structural damper part 12 is connected, for example via a corresponding toothing, torque-proof with the clamp bolt 10 such that during the turning of the clamp bolt 10 together with the operating lever 8 about the lever swivel axis 7 the structural damper part 12 is rotated about the rotational damper axis 11 relative to the structural damper part 13 whereby via the damping fluid, not shown here, the corresponding damping effect is generated. The lever swivel axis 7, about which the clamp bolt 10 is rotated with the operating lever 8, is here also disposed coaxially with the rotational damper axis 11.

Figure 8:
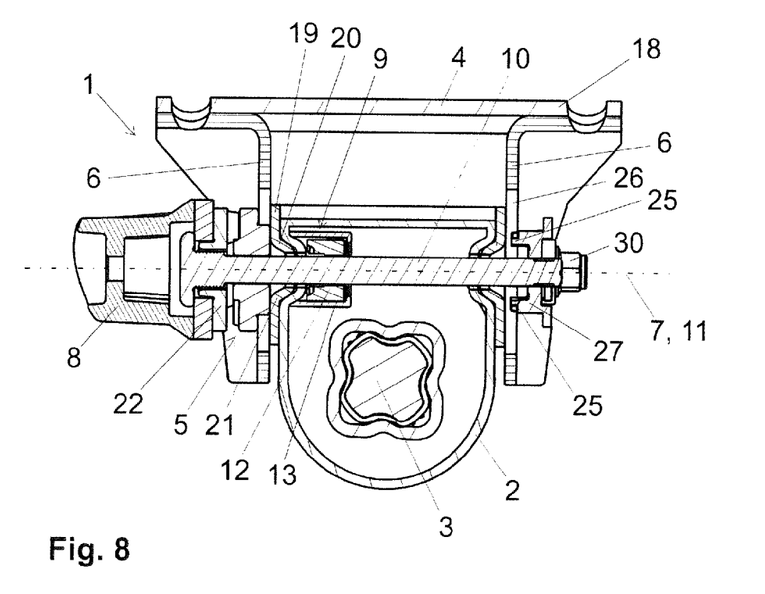
FIG. 8 shows a further embodiment example according to the invention in which the damping element, however, is disposed between the bracket parts.

A further variant according to the invention is shown by example in FIG. 8, in which the damping element 9 is, however, disposed between the bracket parts 6. In this variant, thus, only one bracket part 6 is located between operating lever 8 and cam clamping system 22 on the one side and damping element 9 on the other side. In the variant depicted here the damping element 9 is again a friction rotation damper. The structural damper part 12 is, for example, supported torque-proof on the clamp bolt 10 via a corresponding form closure. The structural damper part 13, which again is implemented as a type of housing, is secured on the steering spindle bearing unit 2 and therewith, with respect to the lever swivel axis 7, torque-proof on bracket part 6 or on bracket unit 4. When, during the swiveling of the operating lever 8, the clamp bolt 10 is rotated about the lever swivel axis 7, then the structural damper part 12 via said form closure turns relative to structural damper part 13 whereby, via the friction closure between these two structural parts, the desired damping effect is generated. In this embodiment example the rotational damper axis 11 and the lever swivel axis 7 also coincide coaxially.

It is in principle also conceivable and feasible to connect the damping element or the structural damper part 12 via a longitudinal press fit or a press fit with the clamp bolt 10. Since the occurring damping torques are relatively small, such a simple press connection can suffice in order to transmit the requisite torques. It is alternatively also conceivable and feasible to apply onto the clamp bolt 10 a longitudinal, transverse or cross knurling, for example through a rolling process which, through the corresponding material changes, leads to a dimensional excess with respect to the diameter of the clamp bolt 10 and to secure thereon the structural damper part 12 using a press fit.

It is in principle also conceivable and feasible to dispose the damping element for damping the swivel movement of the operating lever about the lever swivel axis on a side of the bracket part facing the operating lever. Such a solution is advantageous in particular for securement devices in which the clamping axis is not turned during the swiveling of the operating lever about the lever swivel axis. It is here also conceivable and feasible to dispose a damping system between cam and clamp bolt.

LEGEND TO THE REFERENCE NUMBERS

1 Steering column
2 Steering spindle bearing unit
3 Steering spindle
4 Bracket unit
5 Securement device
6 Bracket part
7 Lever swivel axis
8 Operating lever
9 Damping element
10 Clamp bolt
11 Rotational damper axis
12 Structural damper part
13 Structural damper part
14 Connection
15 Steering wheel adapter
16 Longitudinal direction
17 Height direction
18 Securement plate
19 Intermediate part
20 Bead
21 Bead
22 Cam clamping system
23 Elongated hole
24 Elongated hole
25 Guide peg
26 Elongated hole
27 Bearing part
28 Pin
29 Snap hook
30 Nut
31 Cam carrier
32 Cam
33 Washer disk
34 Toothed rack
35 Toothing element
36 Swivel axis

The invention claimed is:

1. A steering column for a motor vehicle, said steering column comprising:
a steering spindle;
a steering spindle bearing unit that provides rotatable bearing of the steering spindle of the steering column;
a bracket unit for securing the steering column on the motor vehicle, said bracket unit including two bracket parts, wherein the steering spindle bearing unit is disposed between the bracket parts;
a securement device on at least one bracket part of the bracket unit, the securement device including an operating lever swivel-able about a lever swivel axis, and the securement device being displaceable by said operating lever between a closed position and an open position; and
at least one damping element for damping a swivel movement of the operating lever about the lever swivel axis;
wherein the at least one damping element is disposed on a side, opposing the operating lever, of at least one of the bracket parts, and wherein the at least one damping element is disposed between the bracket parts, or both bracket parts are disposed between the damping element and the operating lever, and
wherein the steering spindle bearing unit is secured in position relative to the bracket unit in the closed position of the securement device and, the steering spindle bearing unit is displaceable in position relative to the bracket unit in the open position of the securement device.

2. The steering column recited in claim 1, wherein the securement device comprises a clamp bolt penetrating at least one of the two bracket parts, on which bolt the operating lever is disposed.

3. The steering column recited in claim 2, wherein the damping element is disposed on top of or on the clamp bolt.

4. A steering column for a motor vehicle, said steering column comprising:
a steering spindle;
a steering spindle bearing unit that provides rotatable bearing of the steering spindle of the steering column;
a bracket unit for securing the steering column on the motor vehicle, said bracket unit including one or more bracket parts;
a securement device on at least one bracket part of the bracket unit, the securement device including an operating lever swivel-able about a lever swivel axis, and the securement device being displaceable by said operating lever between a closed position and an open position; and
at least one damping element for damping a swivel movement of the operating lever about the lever swivel axis;
wherein the at least one damping element is disposed on a side, opposing the operating lever, of at least one of the bracket parts,
wherein the steering spindle bearing unit is secured in position relative to the bracket unit in the closed position of the securement device and, the steering spindle bearing unit is displaceable in position relative to the bracket unit in the open position of the securement device,
wherein the damping element comprises at least two structural damper parts which are rotatable relative to one another about a rotational damper axis,
wherein the securement device comprises a clamp bolt penetrating the bracket part or the bracket parts, on which bolt the operating lever is disposed, and one of the structural damper parts is connected torque-proof with the clamp bolt, and the other of the structural damper parts is directly or indirectly connected torque-proof with the bracket part or one of the bracket parts, and wherein the other of the structural damper parts is connected via a detachable connection torque-proof with the bracket part or one of the bracket parts.

5. The steering column as recited in claim 4, wherein the rotational damper axis is disposed coaxially with the lever swivel axis about which the operating lever is swivel-able.

6. The steering column as recited in claim 4, wherein the securement device comprises a clamp bolt penetrating the bracket part or the bracket parts, on which bolt the operating lever is disposed, and the clamp bolt is disposed coaxially with the lever swivel axis about which the operating lever is swivel-able.

7. The steering column as recited in claim 4, comprising a friction closure or a damping fluid or a combination of both between the structural damper parts.

8. The steering column as recited in claim 4, wherein the detachable connection is destructionlessly detachable.

9. The steering column as recited in claim 4, wherein the detachable connection is a bolt or snap connection.

* * * * *